United States Patent [19]
Nakai et al.

[11] Patent Number: 6,154,703
[45] Date of Patent: Nov. 28, 2000

[54] CONTROL FOR VEHICLE NAVIGATIONAL SYSTEM

[75] Inventors: Noboru Nakai; Tadayoshi Naitou; Hiroyuki Kidera, all of Iwata, Japan

[73] Assignee: Yamaha Hatsudoki Kabushiki Kaisha, Shizuoka-ken, Japan

[21] Appl. No.: 09/100,573

[22] Filed: Jun. 19, 1998

[30] Foreign Application Priority Data

Jun. 20, 1997 [JP] Japan ................................ 9-180400
Jun. 20, 1997 [JP] Japan ................................ 9-180401

[51] Int. Cl.7 .................................................. G06F 165/00
[52] U.S. Cl. ..................... 701/200; 701/201; 701/207; 701/208; 701/211; 340/990; 340/998
[58] Field of Search ................................. 701/200, 208, 701/201, 211, 207; 340/988, 990, 995, 461

[56] References Cited

U.S. PATENT DOCUMENTS

| | | | |
|---|---|---|---|
| 4,687,072 | 8/1987 | Komuro | 180/219 |
| 4,888,699 | 12/1989 | Knoll et al. | 364/449 |
| 4,914,605 | 4/1990 | Loughmiller, Jr. et al. | 364/518 |
| 5,270,936 | 12/1993 | Fukushima et al. | 364/444 |
| 5,485,381 | 1/1996 | Heintz et al. | 364/426.04 |
| 5,565,874 | 10/1996 | Rode | 342/457 |
| 5,844,505 | 12/1998 | Van Ryzin | 340/988 |
| 5,875,412 | 2/1999 | Sulich et al. | 701/207 |
| 5,902,348 | 5/1999 | Okamoto et al. | 701/201 |

*Primary Examiner*—William A. Cuchlinski, Jr.
*Assistant Examiner*—Marthe Marc-Coleman
*Attorney, Agent, or Firm*—Knobbe, Martens, Olson & Bear LLP

[57] ABSTRACT

A navigational system particularly adapted for use with small open vehicles such as a motorcycle. The navigational system includes a display which displays, in addition to vehicle speed and distance traveled, navigational information as to points along a preselected course of travel and the distance and turning direction to reach each successive point. The operator may also insert information about each point, such as observations about the point as the name of the point. The display switches from providing a first display condition that provides the travel information and a second condition that permits the insertion of data into the system. The insertion display is not enabled unless the vehicle is in a standing condition.

23 Claims, 7 Drawing Sheets

| Memory | Latitude | Longitude | Memo |
|---|---|---|---|
| 1 | N34° 51' 12" | E137° 56' 43" | |
| 2 | N34° 53' 56" | E137° 56' 54" | |
| 3 | N34° 56' 27" | E137° 59' 35" | |

*Figure 8(A)*

| Memory | Latitude | Longitude | Memo |
|---|---|---|---|
| 1 | N34° 51' 12" | E137° 56' 43" | |
| 2 | N34° 53' 56" | E137° 56' 54" | |
| 3 | N34° 56' 27" | E137° 59' 35" | |

| No. | Date | Time | Latitude | Longitude |
|---|---|---|---|---|
| 1 | 03/27 | 12:00 | N38° 21'18" | E137° 58'49" |
| 2 | 03/27 | 12:30 | N38° 12'51" | E137° 22'38" |
| 3 | 03/27 | 13:00 | N38° 03'32" | E137° 10'29" |

} Data Points Stored At Timed Intervals

*Figure 10(A)*

| No. | Date | Time | Latitude | Longitude |
|---|---|---|---|---|
| 1 | 03/27 | 11:47 | N38° 21'18" | E137° 58'49" |
| 2 | 03/27 | 12:35 | N38° 12'51" | E137° 22'38" |
| 3 | 03/27 | 15:21 | N38° 03'32" | E137° 10'29" |

} Data Points Recorded On Demand

CONTROL FOR VEHICLE NAVIGATIONAL SYSTEM

BACKGROUND OF THE INVENTION

This invention relates to a control for a navigational system for vehicles and more particularly to a control for a navigational system for small, relatively open vehicles such as motorcycles.

In recent years, there has been a growing interest for the incorporation in a vehicle of a navigational system. These navigational systems permit the operator to utilize a computer arrangement for selecting a desired destination. The system then may offer alternative routes to that destination and may, at times, determine the best route for the operator to follow from his present location to his desired destination.

These systems obviously have great advantage, but require thoroughly substantial displays inasmuch as they show the routing via a map. The display normally incorporates a color cathode ray tube or a liquid crystal display also having color capabilities.

In addition to the actual display and computer, it is also necessary to provide a device wherein certain input can be received such as maps of various locals so that the computer can select the appropriate courses. Thus, there is a fairly bulky system required in order to achieve these results. In addition, the display must be positioned in a location so that the operator of the vehicle can easily read it.

Although these goals are quite simple to obtain in large vehicles, such as automobiles, other types of vehicles, such as off the road vehicles or motorcycles, do not have the space capability for handling this type of display. Furthermore, these types of small vehicles do not really lend themselves to the inputting of data from a CD-ROM or other similar device.

The use of complicated map displays can be avoided through the use of a navigational system wherein the system has programmed into it the longitude and latitude of various points along the way and indications of how the direction of travel should be changed at these various points. In this way, it is possible to provide an arrangement wherein the display need only show information such as the next point along the path, the distance to that point, and the direction which the operator should turn when he reaches that point. It is also helpful if the operator can be provided with an indication of the instantaneous direction of travel.

It is, therefore, a principal object of this invention to provide a improved navigational system for a vehicle which this type of information is displayed.

In connection with inputting the information for the course of travel, it is desirable to permit this to be inserted in a relatively easy and trouble-free manner. The source of information can be derived in a variety of manners.

It is, therefore, a further principal object of this invention to provide an improved navigational system of this type and an improved and simplified arrangement wherein the data for the respective points of travel can be easily inserted into the control to simplify its construction and the computer that it requires.

Many times, the vehicle operator may desire to travel to a specific location or alternate locations and keep a record of the way in which he arrived there. This will permit him to accumulate data so that he can make the return trip easily and repeat the path of travel. However, if it is necessary for the operator to stop and insert data at each point, this can be rather inconvenient. Also, with may types of vehicles such as motorcycles it is important the operator need not remove his attention from the road when entering data.

It is, therefore, a further object of this invention to provide an improved and simplified arrangement for entering data into a navigational system when the vehicle is traveling and without requiring loss of the operator's attention.

It also may be desirable for the operator not to have to make the determination of the data points but rather to have the system be capable of automatically entering data at preselected time intervals or distances.

It is, therefore, a still further object of this invention to provide a navigational control system for a vehicle wherein reference point data can be entered automatically at selected time intervals or distances.

With a navigational system of the type that has been described and which uses point-by-point indicators and instructions that the operator should follow at each point, a question arises as to what happens if the operator wishes to change his direction of travel or make a detour around a point. If the system automatically operates to cancel previous points as they are passed, this may give rise to false information if the operator determines to change his course of travel during the trip.

It is, therefore, a still further object of this invention to provide an improve navigational system of this type wherein the operator can control this system by selectively skipping points or arriving at the point through a path other than that which was previously pre-programmed into the system.

SUMMARY OF THE INVENTION

A first feature of the invention is adapted to be embodied in a navigational system for a vehicle that is comprised of a display. There is also provided an input section for receiving inputted location data for a plurality of locations along a path to be traversed. A sensor is incorporated within the display for sensing the actual location of the display. A control sequentially shows on the display the data from the input section as to the next location from the input section and at least the heading to the next location from the sensed location. Means are provided so as to permit the operator to selectively input location data into the input section.

In one embodiment, the input location data may be loaded as a batch by the operator.

In another embodiment, the input location data may be loaded sequentially during a trip.

A further feature of the invention is adapted to be embodied in a navigational system as set forth in the preceding paragraph. In connection with this system, the input section includes an arrangement where the operator enters data to the system to indicate that a location has been reached.

A yet further feature of the invention is adapted to be embodied in a navigational system as set forth above. In accordance with this feature the input data may be transferred without direct mechanical or electrical connections to another system.

DETAILED DESCRIPTION OF THE PREFERRED EMBODIMENTS

Figure 1:
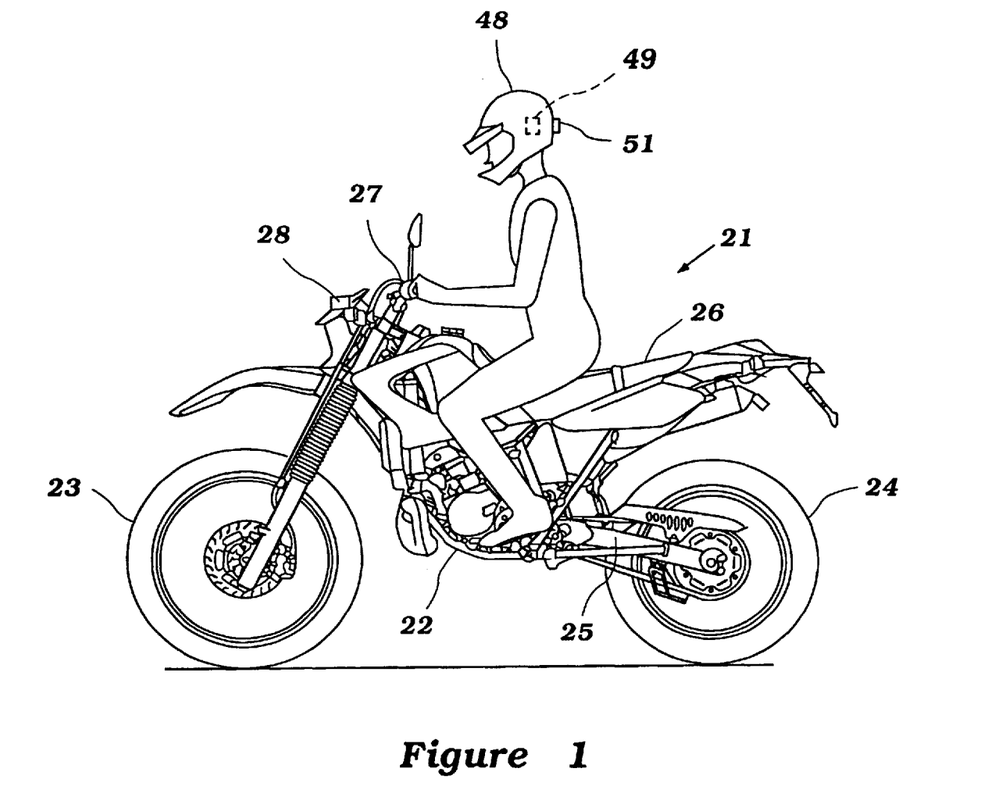
FIG. 1 is a side elevational view of a motorcycle with rider, which motorcycle incorporates a navigational system in accordance with an embodiment of the invention.

Referring now in detail to the drawings, FIG. 1 illustrates a motorcycle, indicated generally by the reference numeral 21, as a typical vehicle with which the invention may be utilized. As should be readily apparent from the foregoing description, the invention has particularly utility in connection with a navigational system for small vehicles which are not normally completely enclosed within a body and wherein many of the components including the display may be exposed to the elements. The motorcycle 21 has a frame assembly 22 that dirigibly supports a front wheel 23. In addition, a driven rear wheel 24 is journaled by a suspension arm 25 at the rear of the frame assembly 21. A rider's seat 26 overlies this suspension arm 25 and accommodates a rider who steers the front wheel 23 through a handlebar assembly 27.

The navigational system and associated display which embodies the invention is positioned forwardly of the handlebar assembly 27 and is indicated generally by the reference numeral 28.

Figure 3:
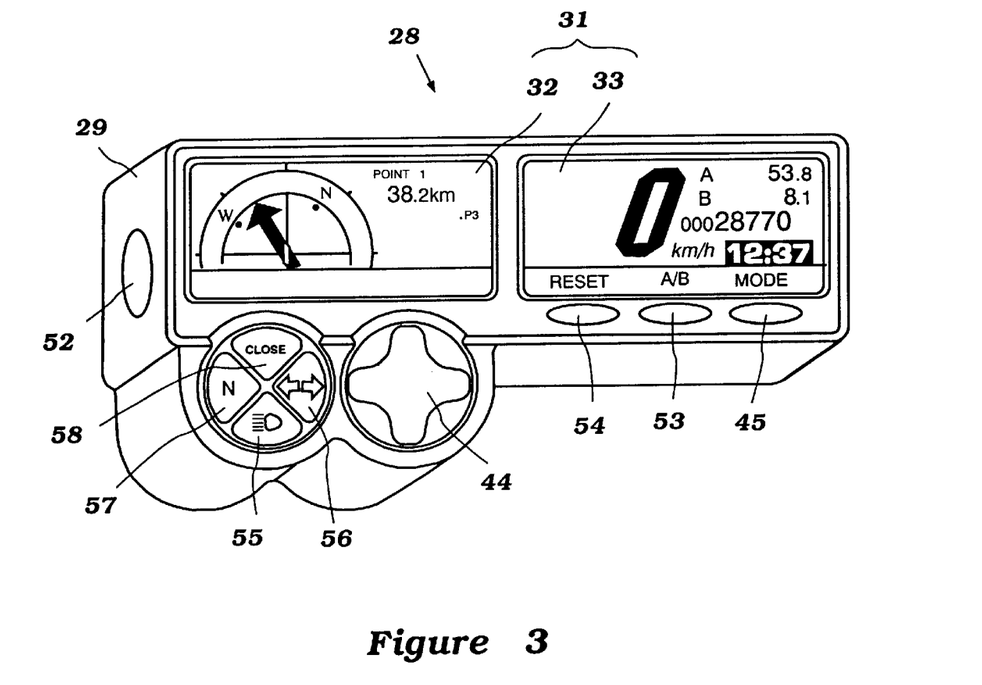
FIG. 3 is a perspective view showing the navigational system and other displays associated with it.
Figure 4:
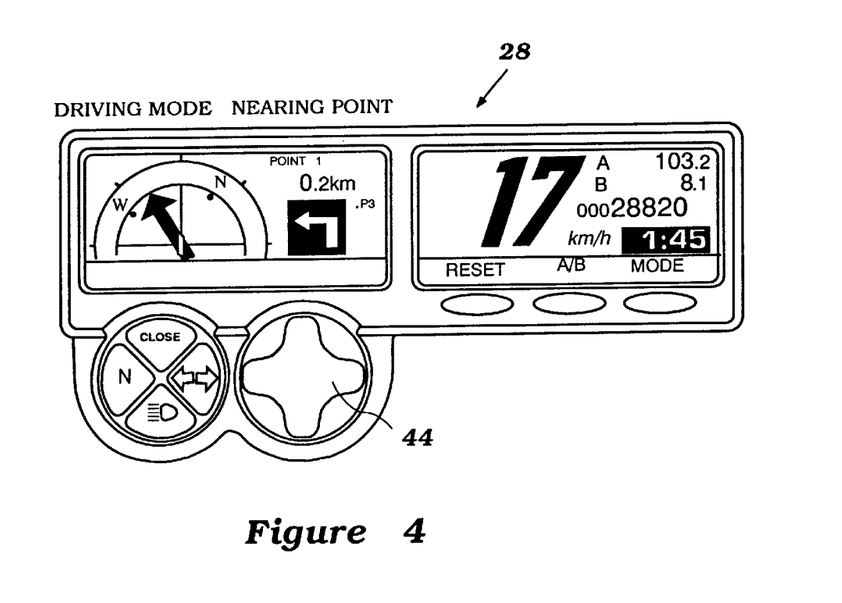
FIG. 4 is a front elevational view of the display showing the condition when approaching a turning point.

The display of the system 28 is shown in more detail in FIGS. 3 and 4 and includes housing assembly 29 that has a display 31 on its rear face which, in this embodiment, comprises a pair of displayed portions 32 and 33. In addition, certain setting and other controls are associated with the housing 29, as will be described later. Although two approximately equal size displays are shown, it is possible to employ only a single display.

The display portion 32 displays navigational information and is always displaying this type of information to the rider, albeit in different forms, as will become apparent. The specific details of this information will be described in more detail later, but basically the information indicates the next point on the journey, the distance to the next point, which is displayed numerically and by way of the arrow, the appropriate heading or azimuth to the next point. Under certain conditions such as when nearing a turning point, for example, the display shifts to the mode shown in FIG. 4 in a manner which will be described so as to alert the rider that a change in direction will be required shortly.

The display 33 shows primarily other vehicle information. In the running mode as shown in FIGS. 3 and 4, the speed is shown digitally and two trip odometers A and B, which can be reset, show trip distances. In addition, there is an overall mileage or odometer reading which is displayed. Furthermore, there is provided a digital clock.

As will be described later, this display section 33 can be switched, under certain circumstances, to display additional, more detailed navigational information and/or to a display which facilitates the showing of the input information and the inputting of information, as will also be described.

Figure 5:
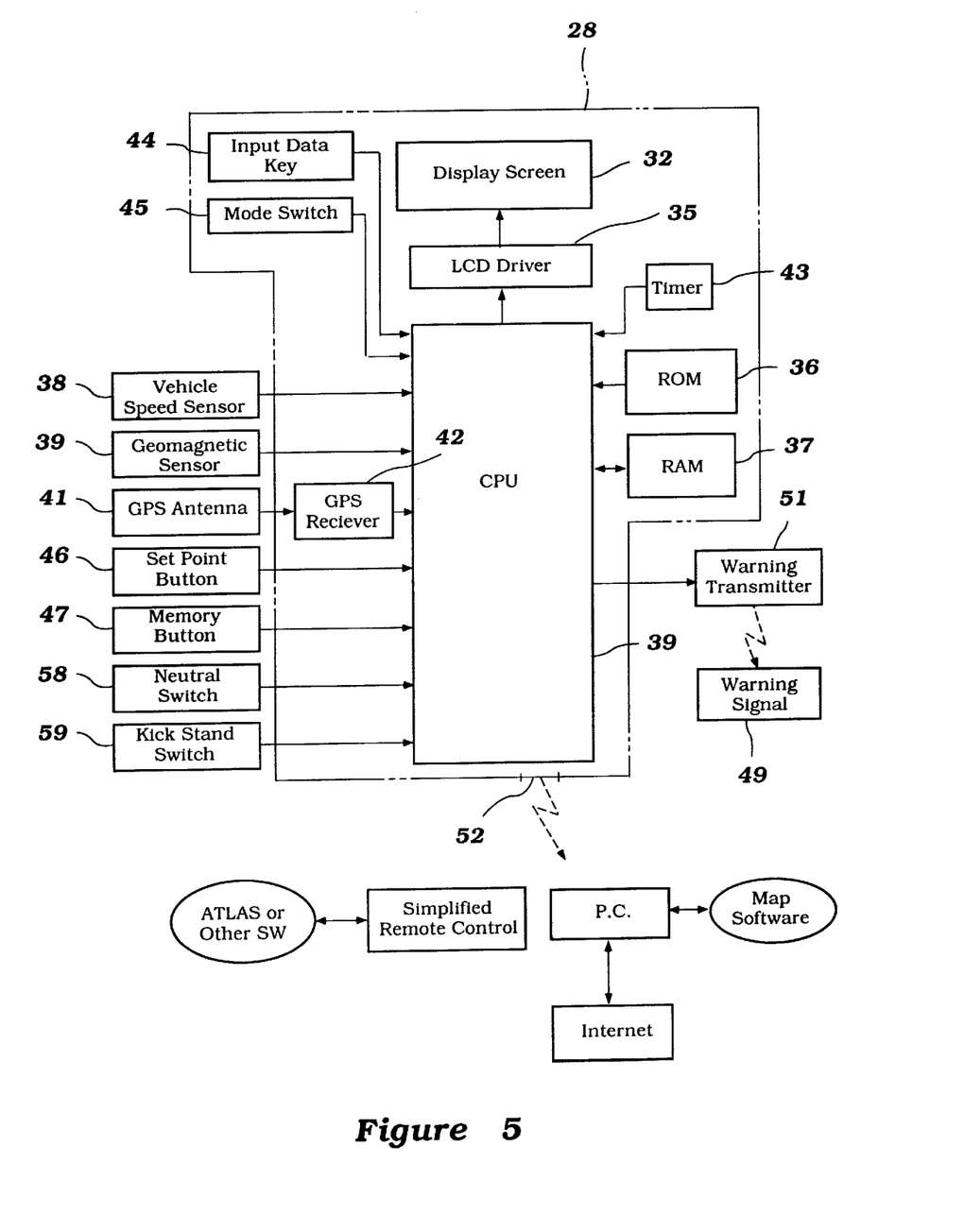
FIG. 5 is a partially schematic block view showing the components of the navigational system and other associated components of the vehicle and how data can be transferred to and from the CPU from and to external sources.

The components of the navigational system 28 are shown in more detail schematically in FIG. 5, and will now be described by particular reference to that figure. This description will also facilitate those skilled in the art to understand how the system operates.

The system 28 is provided with a main CPU 34 that receives certain data and which also drives the display screen 32 through a liquid crystal display driver section 35.

There is provided a read only memory (ROM) that stores data of programs and place names and other fixed information for performing specific calculating functions. This section is indicated by the reference numeral 36.

Also, there is provided a random access memory (RAM) that registers data of points along the route as will also be described.

In order to permit the system to operate so as to calculate speed and distance for driving the speedometers and odometers, there is provided a vehicle speed sensor 38 which may be of any known type, and which outputs its data to the CPU 34.

In addition, a geomagnetic sensor 39 receives magnetic signals from the Earth so as to sense the North Pole condition.

There is also provided a global positioning system (GPS) arrangement that receives satellite data through an antenna 41 which then transmits this data to a receiver 42 so as to provide the CPU 34 with an instantaneous navigational position of the sensor unit 28 and, of course, the associated motorcycle 21.

The clock display and other time functions, as will be noted later, are determined by a timer 43 that inputs a time signal to the CPU 34 so as to perform certain time functions and to indicate the actual time.

There are certain additional switches associated with this system, two of which are included directly in the navigational unit 28. These include an input data key button 44, which the operator depresses when he wishes to input data, as will be described. In addition, there is provided a mode selector switch 45 which is operative to change the display mode of the indicator portion 33.

Figure 2:
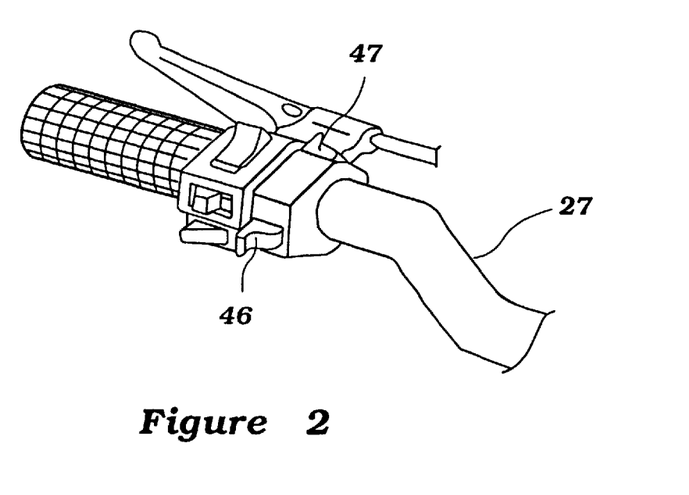
FIG. 2 is a perspective view of one of the hand grips of the motorcycle showing certain of the navigational system controls.

Carried on the handlebar assembly 27 and as also seen in FIG. 2, there are provided two switches that the operator can operate without necessitating his removal from the control of the motorcycle. These include a set point button 46, which, when activated, will perform a function so as to indicate that a point in travel has been passed and switch the display 32 to indicate the next point. Also, there is provided a memory switch 47 that the operator can activate, as will be described later, to store a specific geographic point in the memory of the navigational unit 28.

Although there is a visual display to indicate when the rider should change his position or direction of travel, normal warning signals are not particularly effective in the type of vehicle with which the navigational device 28 is intended to be used. Therefore, the rider's helmet 48 may be provided with a pair of vibrator transducers 49 each associated with a respective side of the rider's head. By changing the magnitude of the vibration signals, the rider can receive a sensory indication of the change in direction which he should make.

That is, if the rider is to execute a sharp left turn, the left vibrator device may be activated while the right hand device can be deactivated. By changing the ratio of activation from one side to the other, the rider can determine the way in which he should turn when he should turn. A receiver 51 is carried by the helmet so as to receive transmitted signals from the CPU 36 so as to activate the vibrators 49 and alert the rider.

Before getting into the detail of the way in which the system operates to provide the navigational information, it should be noted that the housing 29 of the unit 28 is provided with an infrared sensor 52 which is positioned, in a preferred location, on one side or the other of the housing 29. The significance of the side on which the sensor is positioned will be described later by reference to FIGS. 11 and 12.

This infrared window 52 is adapted to receive information which the rider wishes to input as to certain navigational targets. A wide variety of types of devices can be utilized so as to input this information. For example, information may be input externally from an atlas having the longitude and latitude of the various points to be visited and transferred as a batch to the CPU RAM through the infrared sensor 52. Alternatively, a personal computer may be employed that has a program of map software or which can receive information from the Internet so as to determine points along a desired route and these can then be input as a batch through the infrared communication port 52. Obviously, other sources of data can be employed and some of those will be described shortly.

In addition to inputting data, information which the rider has placed into the RAM 37 can be output from the CPU 34 to another machine through the infrared port 52. This also will be described later by reference to FIGS. 11 and 12.

Referring now primarily to FIGS. 3 and 4, certain other components associated with the navigational device 28 and particularly its body assembly will be described. It has been noted that there are provided two trip odometers indicated at A and B, and these odometers can be selected by the switch 53 and reset by a reset switch 54.

There is also provided adjacent the navigational section 32, although other locations are possible, in addition to the input data key 44, certain vehicle indicators, such as a headlight indicator 55, turn signal indicator 56, and neutral condition indicator 57. This neutral condition indicator 57 is operated by a neutral switch 58 (FIG. 5) that senses when the transmission of the motorcycle 21 is in a neutral condition. This neutral switch is also used for another purpose, as will be described.

Finally, there is an indicator light 58 which operates in connection with the position indicator to advise the rider when he is approaching a point when a change in direction or turn should be executed. This condition also causes a switch in the display condition, as seen in FIG. 4. The illustrated example shows that the rider should be prepared to execute a left turn in a close distance such as ²⁄₁₀ths of a kilometer. The distance at which the warning is given will be varied with speed. The greater the speed, the longer the warning distance. As noted above, the vibrator warning will also be transmitted to the rider's helmet.

Figure 6A:
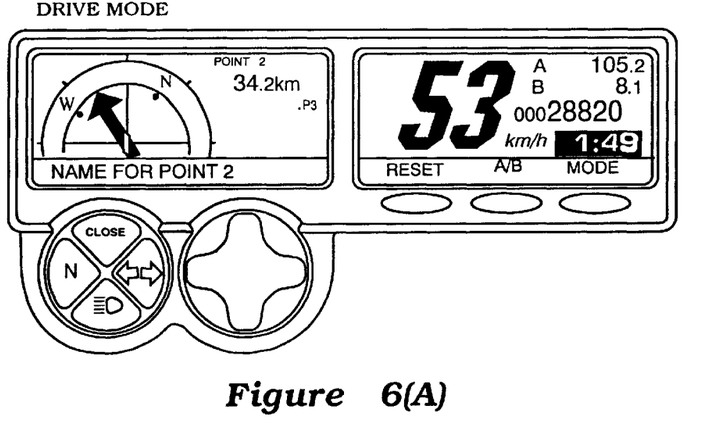
FIG. 6 is a three-part view showing the display in a (a) normal running condition, (b) a navigational, present position condition, and (c) an input data condition.

The various displays afford by the display section 31 will now be described by reference to FIGS. 6 and 7. FIG. 6(A) shows the normal riding mode display. As has been previously noted, in the display section 32, there is provided vehicle information and time, and the indicated condition shows the speed of travel, the two trip odometer readings A and B, the total odometer reading, and the time in a digital form.

The display section 32 displays the navigational data. This permits the indication of the next point on the journey and the distance to the next point. In addition, the heading or azimuth to this point is indicated by the compass arrow.

Furthermore, a name or designation for the previous point which may be inserted by the rider appears at the lower portion of this display. A manner in which the data is input has been mentioned previously, and will be described in some more detail shortly.

Figure 6B:
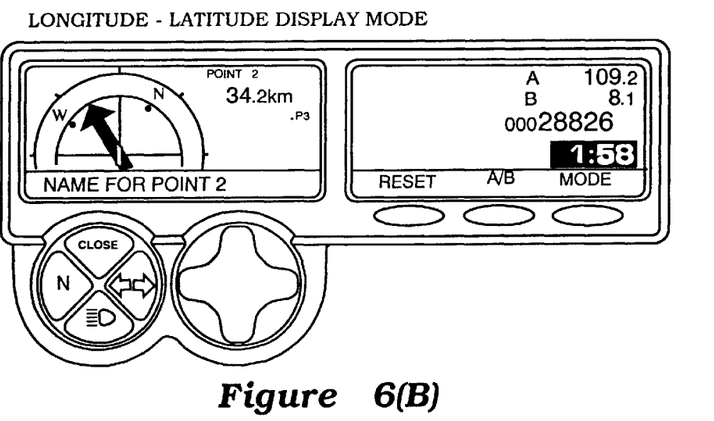

Although the system may be designed so that the operation of the mode selector switch 45 is possible to change from the drive mode display 6(A) to the longitude latitude display mode FIG. 6(B), it is preferable not to permit the operator to select this display mode when the vehicle is operating. Thus, a system maybe incorporated so that the drive mode (A) is displayed automatically when the vehicle is traveling.

This can be determined by sensing the condition of a kick stand switch 59 that senses when the kick stand is extended and also by sensing when the transmission is in neutral by the neutral detector switch 58. The program may be set so as to automatically shift to the longitude latitude display mode FIG. 6(B) at this time.

As seen in this figure, the vehicle speed display disappears and the longitude and latitude at that instant are displayed in its place. Although this is a preferred mode, it can be understood that this instantaneous information also may be displayed simultaneously with the speed during travel by using a smaller display of the speed number.

The final display condition is shown in FIG. (6) and this is one that can only be engaged by the rider by operating the mode change switch and when the vehicle is stationary as determined by the neutral switch 58 and the kick stand switch 59 in the manner previously described.

In this condition, the operator may see the various set points along the trip, indicate the directions at which turns should be made on the trip, and also enter observational data such as interesting points of observation, rest stops, machine shop facilities, and other such information. This can all be entered through a suitable keyboard or by using the various switches or keys already provided on the system.

The various navigational points to be inserted can include various intersections in the road where several roads cross and the direction that the rider should turn at those points. This can be either indicated manually by the rider, or can be fed in from external sources as previously noted. These can be transmitted from a map or computer program. Furthermore, during travel, the rider may input data in a manner which will be described shortly. These added roads appear in the parentheses in FIG. 7.

As a further point of information, it should be noted that the point indication on travel which appears at the left hand side or in the display portion 32 does not automatically change when the next point has been reached. Rather, this system preferably requires the operator to press the switch 46 to reset the point to the next point.

This is done so that if the rider misses a point, he will still be able to go back and find his way since the azimuth indicator will be correct when he turns the vehicle around. That is, the system automatically compensates when a point has been missed.

Also it should be noted that if the indicator is in the condition shown in FIG. (6) to enter information, when the rider begins to operate the motorcycle again, it will shift to the drive mode 6(A) automatically.

Figure 6C:
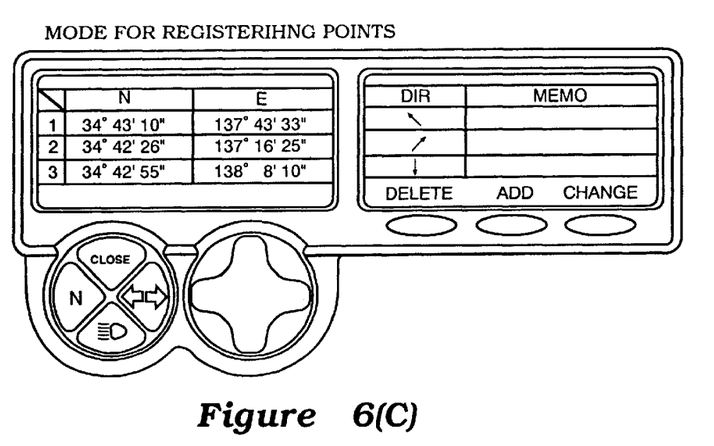
Figure 7:
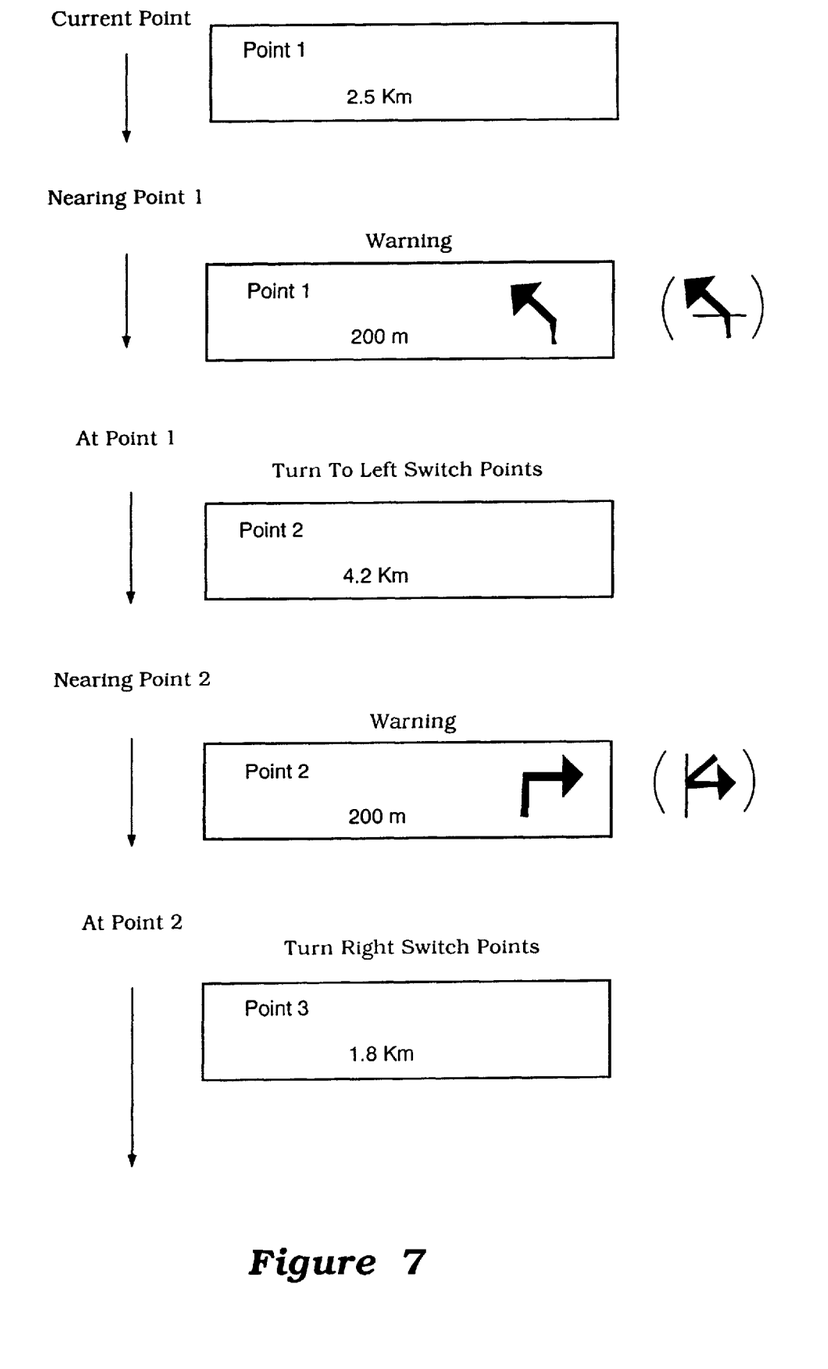
FIG. 7 is a view showing how the display changes during travel.

The manner in which the navigational information in the display 32 is changed as the vehicle, or specifically, the motorcycle 21, travels along its path can be best understood by reference to FIG. 7. This figure shows the display portion indicating the next checkpoint, beginning from the instantaneous position and the distance to the next checkpoint. In the specific example illustrated, the rider is at the point 1 and is 26½ kilometers from the next point, point 1. The display at the lower portion can also have the name of the instantaneous or last point shown if the operator has added that information under the Memo section of the display, as seen in FIG. 6(C).

As the operator approaches the next checkpoint, point 1, in this example, the display continues to show the distance to the next checkpoint. In this particular instance, the next checkpoint is a point where the change of direction occurs, and this normally is at an intersection.

As seen in parenthesis to the right of the second block in this figure, the operator may have inserted data to show that there is a multi-road intersection, and rather than just a turn at this point. This can be optional.

As the point 2 is approached, the light 58 will flash, and also the audible or vibrator warning of signals by the vibrators 49 will be given. In the illustrated embodiment, there will be a signal from the left ear which is louder, and a signal from the right ear which is weaker. This will indicate that the turn should be to the left, but not a 90° turn.

After having passed the checkpoint, the operator should press the handlebar switch 46 to advance the indicator to the next point. The display will then change, as shown in the third block, to indicate that the point 1 has been passed and there is 4.2 kilometers to the next checkpoint 2.

It should be noted that each time the vehicle approaches a point on the route, the vehicle direction at that time point is detected by the geomagnetic sensor 39, and this information is compared with the actual driving direction. If there is a difference, the previously inputted absolute azimuth of the driving direction is corrected. Also, corrections will be made in the directions for following turns.

As the rider continues on, the next checkpoint comes up, and again, he will be given a warning, make the change in direction at the appropriate time, and then advance the point setting.

By permitting the operator to make these settings merely by pressing the button on the handlebar 27, he need not remove his hands from the controls, and also, his attention from the road will not be disturbed when updating the data.

Because of the way the data is input and displayed, if the operator misses a turn and must turn around, or if he approaches the point from a different direction due to some other deviation, since the geomagnetic sensor cooperates with the azimuth reading, it will be insured that his directions will always be proper and appropriate.

Although the system has been described with a requirement that the operator manually advise the system 28 that a checkpoint has been reached and passed, it also is possible to utilize automatic switching. This may have some disadvantages. For example, if the operator makes an intentional detour around a point on the route, the route guidance will thereafter become inoperative. Also, the driver may overlook when the vehicle has passed the current point on the route. In the case of manual operation, the direction indicating arrow turns in the opposite direction upon passing the current point, and this will be immediately noticed by the rider. With an automatic system, however, if the rider has inadvertently passed the point and turns back, then the route guidance for the next point may have started, and the system will give incorrect information.

The system has been described in conjunction with arrangements wherein the preset points for the navigational system are programmed in through a personal computer or some external control system. However, the device also permits a rider to select a route which he may wish to travel again while actually traversing that route.

The way this is done is that the rider will ride to a location which he finds of particular interest, either from a scenery standpoint or to get to a specific location. He then can enter data manually as to the specific location. The way this is done is that he must first stop the motorcycle, shift the transmission into neutral, and set the motorcycle on the kick stand. Only then can he operate the mode switch so as to create the display shown in FIG. 6(C).

Figure 8A:
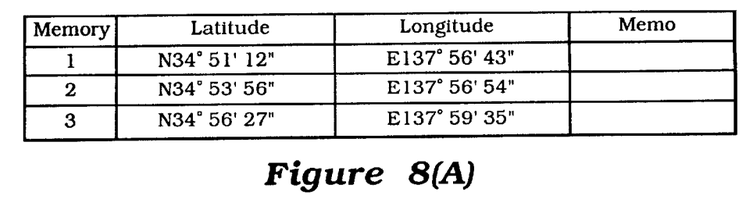
FIG. 8 is a graphical view showing how data can be input into the memory and notes added.
Figure 8B:
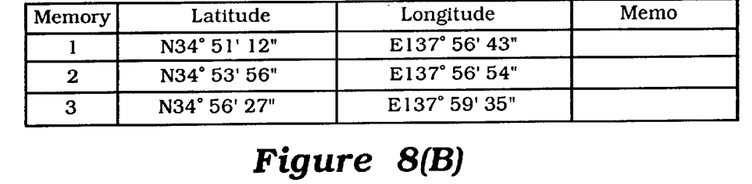

When he reaches this display mode, he may then delete existing data or add a new data. FIG. 8(A) shows how such new data can be entered. That is, if the operator wants to make a particular notation of a particular place, he need merely read the latitude and longitude for that place and enter it, or have the device enter it automatically by pressing the memory button at that particular location. The operator then need not switch the display back to the drive mode.

However, when he either retracts the kick stand and/or shifts the transmission from neutral, the display mode 6(A) will resume. The rider may then move to the next point along his chosen path of travel and enter such appropriate information at those points so as to accumulate data for a new trip.

Figure 9:
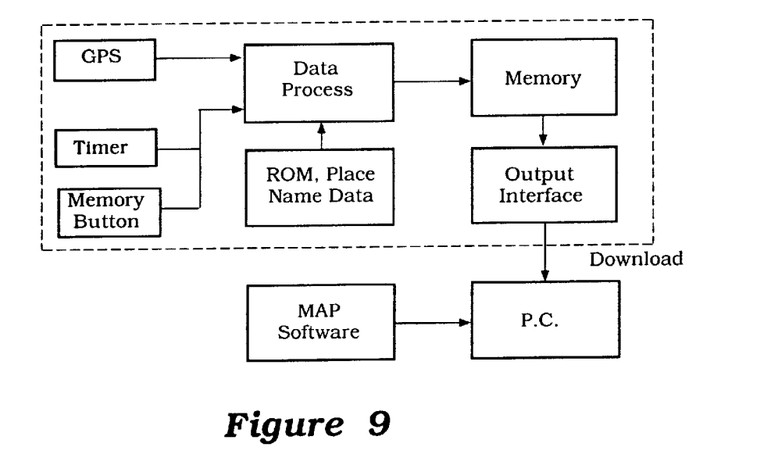
FIG. 9 is a partially schematic block diagram showing the relationship of certain of the components in connection with the navigational system during data transfer.
Figure 10A:
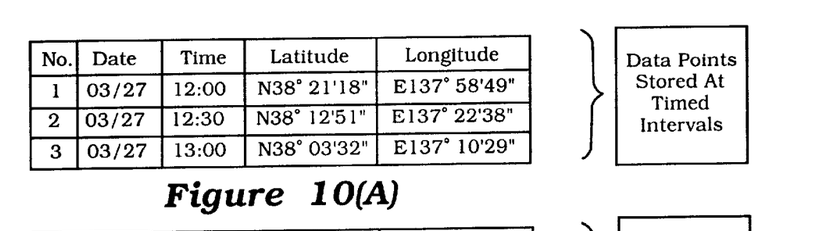
FIG. 10 is a block diagram showing how the data may be input to the system in either a time or operator selected mode.

As another alternative, the data can be programmed to memorize certain data along a trip at fixed time intervals. FIG. 9 shows an interface arrangement for doing that, and FIG. 10 in Group A shows how the data would appear when stored. The system can operate so as to permit the taking of location data at fixed time intervals, and an interval of every half-hour is shown in FIG. 10a. Thus, the rider rides along, and at every half-hour interval, a reading of location is taken. This data is stored in the memory, and the rider may then add memo data later when stopped.

Figure 10B:
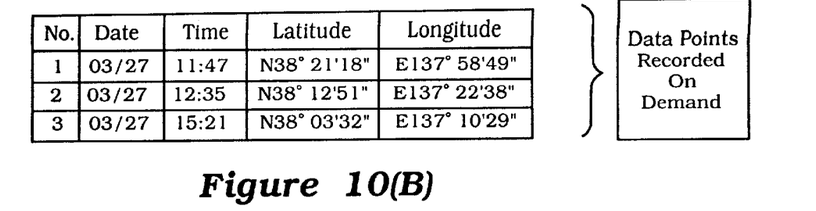

Alternatively, the operator may take this data while he is riding. He can ride along a path, and at times that he chooses, press the memory switch or button 47 on the handlebar assembly, without removing his hands. Then the data is stored as shown in FIG. 10, wherein the time at which the rider pressed the memory button and the latitude and longitude at that point then will be recorded. After completing his trip, the rider may then make such edits as he wishes in the memo section. In this mode, the rider need not remove his hands from the control, nor need he look at any display. Thus, he is able to maintain this data, or collect this data and edit it later as he sees fit.

Also, because of the inclusion of the timer, it is possible for the rider to see average speed and other data.

Figure 11:
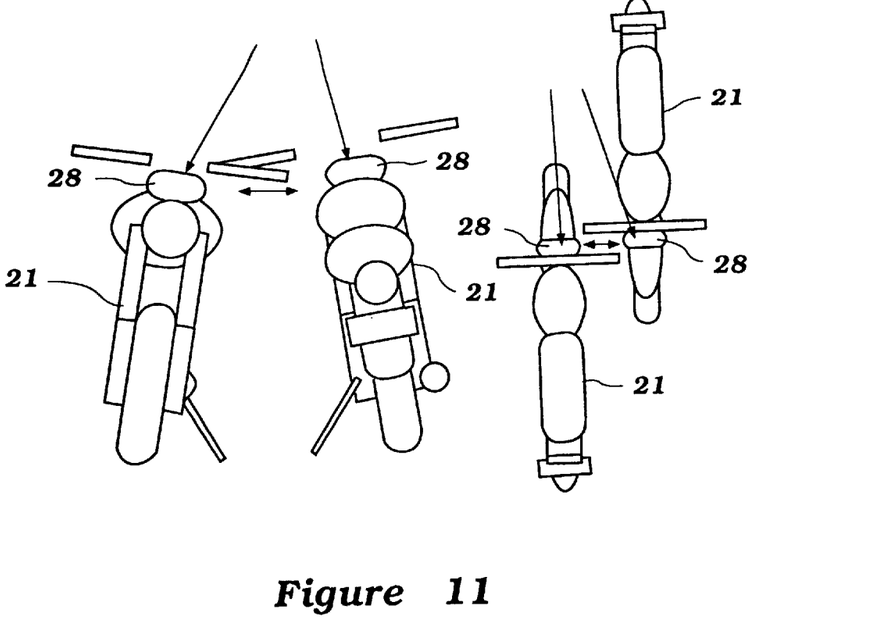
FIG. 11 is a rear and top plan view of an embodiment showing how data can be interchanged between two motorcycles in accordance with one embodiment of the invention.
Figure 12:
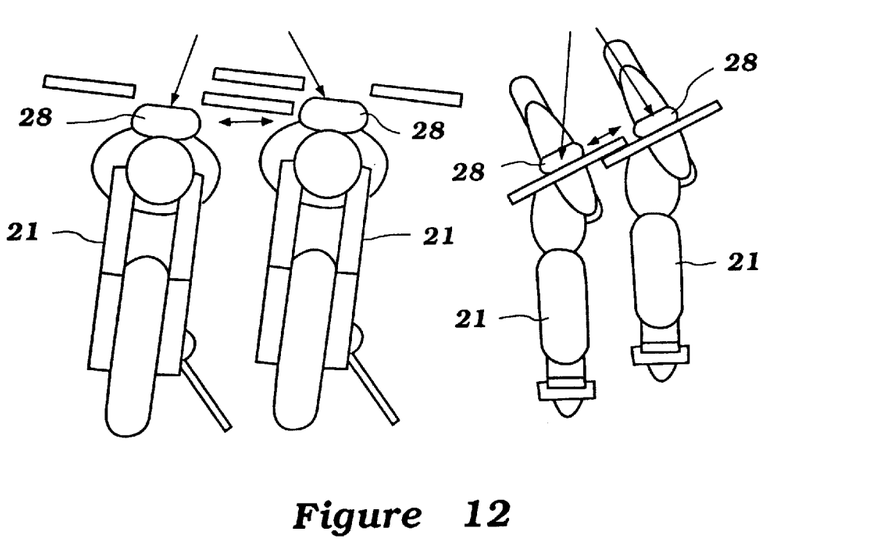
FIG. 12 is a side and top plan view showing another embodiment arrangement for exchanging information between two motorcycles.

As has been previously noted, the infrared sensor 52 not only can receive data, but can send data. FIGS. 11 and 12 show two different embodiments, wherein the data can be transferred from one motorcycle to another. Thus, if a rider has taken a particularly interesting ride or has recorded directions to get from one place to another and wishes to share that information with another rider, the data can be transferred between the two units by their infrared sensors 52.

It has been previously noted that the sensor 52 is preferably placed on one side of the control housing 29. FIG. 11 shows an arrangement wherein there is a left-hand drive, and in this situation, the sensors 52 are placed on the left-hand side of the housing 29. Thus, when the motorcycles are at rest on kick stands and reversed relative to each other, there respective sensors 52 will be in registry, and data can be exchanged, as shown in FIG. 11. If there is a right-hand drive, then the opposite side location can be chosen.

FIG. 12 shows an arrangement wherein there are sensors on both sides, and this permits the motorcycles to be placed in side-by-side fashion and facing in the same direction, so as to transmit data.

Thus, it should be readily apparent from the foregoing description that the disclosed system provides a very simple yet highly effective navigational system that is particularly adapted for use on vehicles that do not have the size and space accommodations of larger vehicles such as automobiles. Also, because no external wiring is required to transfer data, the system can withstand the elements without damage.

Of course, the foregoing description is of preferred embodiments of the invention, and various changes and modifications can be made without departing from the spirit and scope of the invention, as defined by the appended claims.

What is claimed is:

1. A navigational system for a vehicle comprised of a display, an input section for receiving input location and path data for a plurality of sequential locations and a path between said sequential locations, a sensor for sensing the actual location of said display, a control for sequentially displaying on said display the data from said input section as to the next location from the input section and at least the heading toward the next location from the sensed instantaneous location and said input location and path data, and means for selectively permitting the operator to selectively input location and path data into said input section.

2. A navigational system for a vehicle as set forth in claim 1 wherein the means for selectively permitting the operator to selectively input location and path data into the input section permits the input location data to be loaded as a batch.

3. A navigational system for a vehicle as set forth in claim 2 wherein the means for selectively permitting the operator to selectively input location and path data into the input section comprises an infrared device for exchanging data with an external source without requiring electrical or mechanical connections.

4. A navigational system for a vehicle as set forth in claim 3 wherein the input section receives data through the infrared device.

5. A navigational system for a vehicle as set forth in claim 4 wherein the input section is also capable of transmitting input location and path data through the infrared device to another navigational system.

6. A navigational system for a vehicle as set forth in claim 1 wherein the means for selectively permitting the operator to selectively input location and path data into the input section permits the operator to enter location data sequentially during a trip.

7. A navigational system for a vehicle as set forth in claim 6 wherein the data is entered at sequences determined by the operator.

8. A navigational system for a vehicle as set forth in claim 6 wherein the data is entered automatically at timed sequences.

9. A navigational system for a vehicle as set forth in claim 1 wherein the rider must reset the display after each location has been reached in order to display the information regarding the next location.

10. A navigational system display for a motorcycle, said display being comprised of a display, an input section for receiving input location data for a plurality of sequential locations, a sensor for sensing the actual location of said display, a control for sequentially displaying on said display the data from said input section as to the next location from the input section and at least the heading toward the next location from the sensed instantaneous location, and means for selectively permitting the operator to selectively input location data into the input section sequentially during a trip and wherein the display input section sensor and control are mounted as a unit adjacent to the handlebars thereof.

11. A navigational system for a vehicle as set forth in claim 10 wherein the data is entered at sequences determined by the operator.

12. A navigational system for a vehicle as set forth in claim 11 wherein the data is entered by the operator actuating a switch carried on a handlebar of the motorcycle.

13. A navigational system for a vehicle as set forth in claim 12 wherein the switch when actuated registers the output at that instant in the input section.

14. A navigational system display for a vehicle as set forth in claim 11 wherein the data can only be entered by the operator when the vehicle is stationary.

15. A navigational system display for a vehicle as set forth in claim 14 wherein the vehicle is sensed to be stationary by the condition of a transmission of the vehicle.

16. A navigational system display for a vehicle as set forth in claim 14 wherein the vehicle comprises a motorcycle and wherein the display input section, sensor and control are mounted as a unit adjacent to the handlebars thereof.

17. A navigational system display for a vehicle as set forth in claim 16 wherein the motorcycle has a kick stand the motorcycle is sensed to be stationary when said kick stand is extended.

18. A navigational system for a vehicle as set forth in claim 10 wherein the data is entered automatically at timed sequences.

19. A navigational system display for a motorcycle, said display being comprised of a display, an input section for receiving input location data for a plurality of sequential locations, a sensor for sensing the actual location of said display, a control for sequentially displaying on said display the data from said input section as to the next location from the input section and at least the heading toward the next location from the sensed instantaneous location, and means for selectively permitting the operator to selectively input location data into the input section and wherein the display input section, sensor and control are mounted as a unit adjacent to the handlebars thereof, said control requiring the rider to reset said display after each location has been reached in order to display the information regarding the next location.

20. A navigational system display for a vehicle as set forth in claim 19 wherein the reset of the display is done by a switch carried by the handlebars.

21. A navigational system display for a vehicle as set forth in claim 20 wherein the switch is on a handle grip.

22. A navigational system for a vehicle as set forth in claim 1 wherein the means for permitting the operator to enter data to said system permits entry to indicate that a location has been reached and the path followed to reach that location.

23. A navigational system display for a vehicle as set forth in claim 22 wherein the display shows information regarding the next location after the operator enters data to the system to indicate that the previous location has been reached.

* * * * *